(12) United States Patent
Heim

(10) Patent No.: US 6,787,950 B2
(45) Date of Patent: Sep. 7, 2004

(54) STATOR FOR AN ELECTRIC DRIVE WITH A TUBULAR INSULATOR AS LOST CASTING MOLD

(75) Inventor: Bruno Heim, Grosseibstadt (DE)

(73) Assignee: Siemens Aktiengesellschaft, München (DE)

(*) Notice: Subject to any disclaimer, the term of this patent is extended or adjusted under 35 U.S.C. 154(b) by 206 days.

(21) Appl. No.: 09/928,868

(22) Filed: Aug. 13, 2001

(65) Prior Publication Data

US 2002/0047480 A1 Apr. 25, 2002

(30) Foreign Application Priority Data

Aug. 23, 2000 (DE) .......................................... 100 41 330

(51) Int. Cl.[7] .................................................. H02K 9/00
(52) U.S. Cl. .......................................... 310/64; 310/43
(58) Field of Search .............................. 310/52, 54, 58, 310/64, 87, 42, 43

(56) References Cited

U.S. PATENT DOCUMENTS 3,135,884 A * 6/1964 Luenberger .................. 310/87
3,742,595 A * 7/1973 Lykes ........................... 29/596
6,222,289 B1 * 4/2001 Adames ....................... 310/54

FOREIGN PATENT DOCUMENTS

DE 1 797 835 10/1959
DE 1 118 342 11/1961

* cited by examiner

Primary Examiner—Dang Le
Assistant Examiner—Nguyen N Hanh
(74) Attorney, Agent, or Firm—Henry M. Feiereisen

(57) ABSTRACT

A stator for an electric drive, includes a stator housing configured in the form of a stack of laminations and having a stator bore. The housing is surrounded by a cooling jacket and has opposite winding end portions. Tubular insulators abut the bore-confronting inner surface of the winding end portions, whereby the tubular insulators bound respective cavities in concert with end faces of the stator housing and the cooling jacket for receiving the winding end portions, with the cavities being filled with insulating casting material.

10 Claims, 2 Drawing Sheets

STATOR FOR AN ELECTRIC DRIVE WITH A TUBULAR INSULATOR AS LOST CASTING MOLD

CROSS-REFERENCES TO RELATED APPLICATIONS

This application claims the priority of German Patent Application Ser. No. 100 41 330.7, filed Aug. 23, 2000, the subject matter of which is incorporated herein by reference.

BACKGROUND OF THE INVENTION

The present invention relates, in general, to a stator for an electric drive, and more particularly to a stator having winding end portions masked by insulating material. The present invention is also directed to a method of potting winding end portions of a stator for an electric drive.

German patent specification DE 1118342 describes a stator having winding end portions which are covered by an insulating tape, whereby a tape area, which projects beyond the edge of the winding end portion, is turned inwardly in axial direction over the winding end portion toward the pole bore to thereby insulate the winding end portion.

German utility model 1 797 835 describes a protection of the winding end portions through pre-formed caps of insulating material, whereby the caps are placed over the winding end portions. Such caps are made in particular from a rigid and dust-proof textile material and cast with an insulating material.

Insulation and protection of winding end portions of stators for an electric drive through casting with insulating material, especially resin, have been proposed; However, conventional insulating processes are disadvantageous because of the need for usage of conventional casting tools of steel or silicone. The casting process is executed by lining the casting mold with parting agents, installing the casting mold, dismantling the casting mold after the casting process, and subsequently cleaning the casting mold. This casting process is time-consuming and is characterized by significant nonproductive periods, when stators for electric drives are cast, resulting in an increase of production costs. Another drawback associated with this conventional process to cast stators is the insufficient coverage with insulating casting material of wires or coil components that may be too closely disposed to the casting tool. As a consequence, oftentimes, these areas have problems as far as strength is concerned.

It would therefore be desirable and advantageous to provide an improved stator and to provide an improved process of making a stator, to obviate prior art shortcomings.

SUMMARY OF THE INVENTION

According to one aspect of the present invention, a stator for an electric drive includes a stator housing configured in the form of a stack of laminations and having opposite winding end portions and a stator bore which defines an axis; a pair of tubular insulators for respectively abutting the axis-confronting inner surface of the winding end portions; a cooling jacket, arranged in circumferential direction of the stator housing, wherein one tubular insulator in concert with an end face of the stator housing and the cooling jacket bounds a cavity for receiving one winding end portion, and wherein the other tubular insulator in concert with another end face of the stator housing and the cooling jacket bounds a cavity for receiving the other winding end portion; wherein insulating casting material is poured into each of the cavities to fill it out to thereby realize a potting of the winding end portions.

The present invention resolves prior art problems by utilizing the tubular insulator as lost casting mold for potting the winding end portions of a stator so that the need for casting tools is eliminated. The use of the tubular insulator also protects the winding end portion from damage during material-removing processes, such as turning or grinding. In particular, when installing a rotor of a synchronous motor in the stator bore, the permanent magnets of the rotor cause strong magnetic forces that tend to move the rotor out of the center of the bore. As a consequence, when using conventional insulating methods, there is a risk of contact that may lead to a damage of the winding end portion.

According to another feature of the present invention, the installation of the tubular insulator is simplified by providing the tubular insulator at its stator housing confronting end face with a centering ring for radially centering the tubular insulator in relation to the stator bore of the stator housing. Suitably, the centering ring is formed integrally with the tubular insulator.

According to another feature of the present invention, the stator may have circular cover slides which engage slots of the stator housing at one end face thereof to mask the slot structure, and are arranged in surrounding relationship to the stator bore and project beyond the end faces of the stator housing, wherein the centering rings support the tubular insulators against the cover slides and seal a junction between the tubular insulators and the end faces of the stator housing in radial direction by bearing against the cover slides and in axial direction by bearing upon the slot flanks.

According to another feature of the present invention, the tubular insulator has a stator housing distal end provided with a reinforcement that enhances stability and serves as measure for a required filling height during pouring of the casting material.

According to another aspect of the present invention, the tubular insulator may be used as lost casting mold for potting the winding end portions with casting material, whereby the tubular insulator is centered in relation to the stator bore by abutting the tubular insulator against the bore-confronting inner surface of the winding end portion such that the tubular insulator bounds a cavity in concert with an end face of the stator housing and a cooling jacket, arranged in circumferential direction of the stator housing, for receiving the winding end portion, with the cavity being filled out with insulating casting material.

According to still another aspect of the present invention, a method of potting winding end portions of a stator for an electric drive includes the following steps: centering a tubular insulator in relation to a stator bore by abutting the tubular insulator against a bore-confronting inner surface of a winding end portion; forming a cavity for receiving the winding end portion, with the cavity being bounded by the tubular insulator in concert with an end face of a stator housing and a cooling jacket, arranged in circumferential direction of the stator housing; and filling the cavity with insulating casting material.

BRIEF DESCRIPTION OF THE DRAWING

Other features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
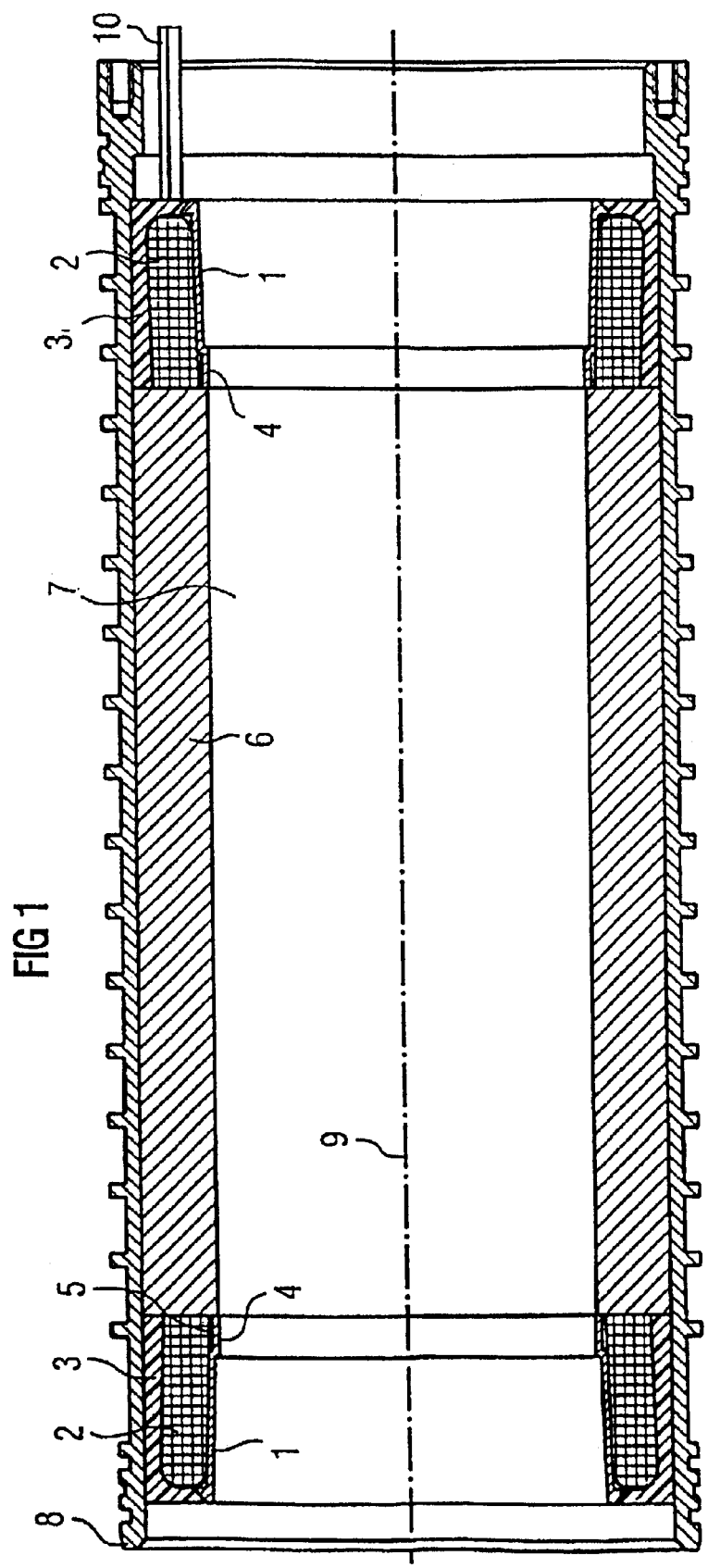
FIG. 1 is a longitudinal section of a stator according to the present invention.

Throughout all the Figures, same or corresponding elements are generally indicated by same reference numerals.

Turning now to the drawing, and in particular to FIG. 1, there is shown a longitudinal section of a stator according to the present invention, including a stator housing 6 in the form of a stack of laminations of sheet metal. The stator housing 6 has a longitudinal stator bore 7, defined by a longitudinal axis 9, for receiving a, not shown, rotor, and is formed with, not shown, slots to support a winding, whereby winding end portions 2 are disposed outside the slots and respectively jut out from opposite axial end faces of the stator housing 6. Cover slides 5 are further provided to engage the slots and thus to mask the slot structure. The cover slides 5 are circular in structure and arranged in surrounding relation to the stator bore 7 and project beyond the end faces of the stator housing 6.

The stator housing 6 is placed in a cooling jacket 8 of steel. Motor connection lines 10 are routed through the right-hand opening of the cooling jacket 8 to the winding.

Figure 2:
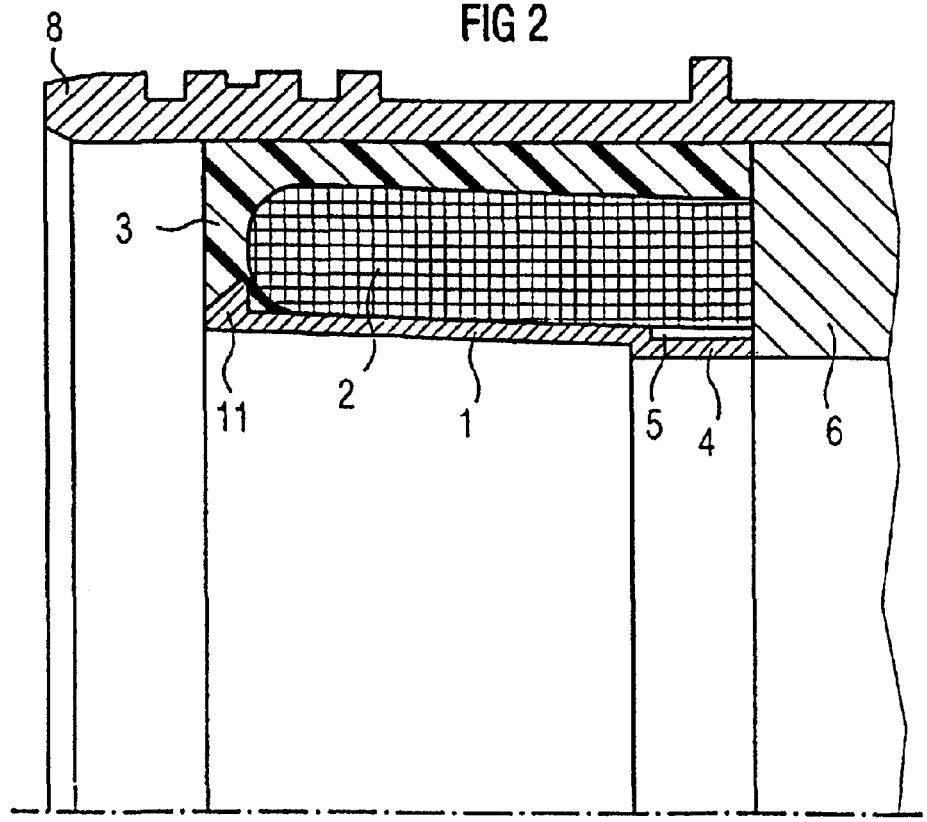
FIG. 2 is an enlarged detailed sectional view of the area around a potted winding end portion.

As the winding end portions 2 on the opposite axial end faces of the stator housing 6 are of an identical construction, only one of the winding end portions 2 will hereinafter be described in detail. It will be understood by persons skilled in the art that a description of the area of one of the winding end portions 2 is equally applicable to the area of the other winding end portion 2. FIG. 2 shows hereby an enlarged detailed sectional view of the area around the left-hand winding end portion 2 of FIG. 1.

Each winding end portion 2 has an axis-confronting inner surface which is abutted by a tubular insulator 1 made, for example, of a thermoplastic material, thereby forming with the cooling jacket 8 and the respective end face of the stator housing 6 a mold having a cavity in which the winding end portion 2 is disposed, whereby insulating casting material, e.g., resin, is poured into the cavity to fill out the area between the tubular insulator 1 and an inner surface of the cooling jacket 8. Thus, the mold, called "lost mold" because of its one-time use only, remains attached to the potted winding end portion 2.

Figure 3:
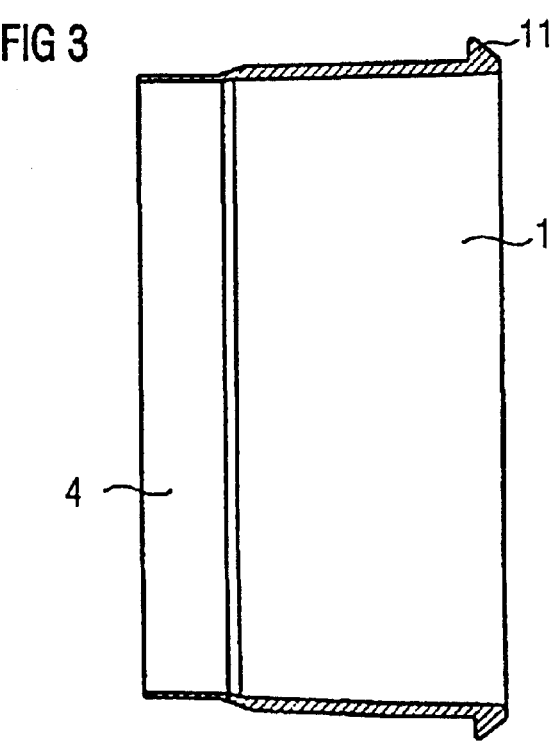
FIG. 3 is a longitudinal section of a tubular insulator with centering ring.

FIG. 3 shows in more detail one embodiment of the tubular insulator 1. In this embodiment, the tubular insulator 1 has a substantially cylindrical cross section and is made, preferably, of thermoplastic material, such as polyamide, e.g. PA 66 GF 30. In order to improve handling, for example, when the winding end portions 2 are not in exact parallel relationship, the tubular insulator 1 may have a slight truncated cone shape by slightly chamfering the end face that is to be inserted in the direction toward the confronting end face of the stator housing 6 or by providing this end face with a slightly smaller diameter than the opposite housing-distal end face. As shown in FIG. 3, the housing-distal end face of the tubular insulator 1 is formed with a circumferential ridge-like reinforcement 11, whereby the reinforcement may have a generally triangular configuration, as shown by way of example only.

The tubular insulator 1 is so sized as to fit precisely against the inner surface of the winding end portion 2, confronting the axis 9 of the stator. Care should be taken that the tubular insulator 1 is properly centered in the stator bore 7. Accordingly, the tubular insulator 1 is provided at its end face to be inserted in the direction of the end face of the stator housing 6 with a centering ring 4. Suitably, the centering ring 4 forms an integral part of the tubular insulator 1.

Referring again to FIG. 2 to describe the function of centering ring 4, it can be seen that the centering ring 4 supports the tubular insulator 1 against the confronting backside of the cover slide 5 to thereby center the tubular insulator 1 in relation to the stator bore 7. In addition, the centering ring 4 provides a sealing in radial direction by abutting against the backside of the cover slide 5 and in axial direction by bearing against the slot flanks, not shown, of the last lamination of the stator housing 6 so as to prevent escape of casting material 3 when poured into the cavity for potting the winding end portion 2.

The casting process is carried out with the stator housing 6 being disposed in upright position to allow pouring of the casting material 3 into the cavity. The circumferential reinforcement 11 of the tubular insulator 1 provides hereby not only a mechanical stabilization during the casting process, but serves also as indication whether the required filling height of the casting material 3 has been reached so that the winding end portion 2 is completely covered with casting material 3. The dimension of the reinforcement 11 is selected to provide a tolerance as far as the pouring height of casting material is concerned. As soon as the casting material 3 reaches the reinforcement 11, upon correct placement of the tubular insulator 1, the winding end portion 2 is completely covered with casting material 3. Care should be taken that casting material 3 is not poured beyond the outer rim of the reinforcement 11 to prevent casting material 3 from overflowing into the stator bore 7. After finishing one side thereof, the stator housing 6 is turned around to allow potting of the winding end portion 2 on the other side of the stator housing 6.

While the invention has been illustrated and described as embodied in a stator for an electric drive with a tubular insulator as lost casting mold, it is not intended to be limited to the details shown since various modifications and structural changes may be made without departing in any way from the spirit of the present invention.

What is claimed as new and desired to be protected by Letters Patent is set forth in the appended claims.

What is claimed is:

1. A stator for an electric drive; comprising:
 a stator housing in the form of a stack of laminations, said housing having opposite winding end portions and a stator bore which is defined by an axis;
 a pair of tubular insulators, one tubular insulator abutting an axis-confronting inner surface of one winding end portion and the other tubular insulator abutting an axis-confronting inner surface of the other winding end portion; and
 a cooling jacket arranged in circumferential direction of the stator housing, wherein a cavity is bounded only by one tubular insulator in concert with an end face of the housing and the cooling jacket for receiving one winding end portion, and wherein another cavity is bounded only by the other tubular insulator in concert with another end face of the housing and the cooling jacket for receiving the other winding end portion, with each of the cavities being filled out with insulating casting material.

2. The stator of claim 1, wherein each tubular insulator has a housing-confronting end face which includes a centering ring for radially centering the tubular insulator in relation to the stator bore of the housing.

3. The stator of claim 2, wherein the centering ring is formed integrally with the tubular insulator.

4. The stator of claim 2, and further comprising a pair of circular cover slides, one cover slide engaging slots of the housing at one end face thereof to cover a slot structure, and the other cover slide engaging slots of the housing at another end face thereof to cover a slot structure, wherein the cover slides are arranged in surrounding relationship to the stator bore and project beyond the end faces of the housing, wherein the centering rings support the tubular insulators against the cover slides and seal a junction between the tubular insulators and the end faces of the housing in radial direction by abutting against a backside of the cover slides and in axial direction by bearing against slot flanks.

5. The stator of claim 1, wherein each tubular insulator has a housing-distal end provided with a reinforcement for providing a measure for a required filling height of the casting material during potting of the winding end portions.

6. An electric drive, comprising:
a stator including a stator housing in the form of a stack of laminations said housing having opposite winding end portions and a stator bore which is defined by an axis and destined for receiving a rotor;
a pair of tubular insulators, one tubular insulator abutting an axis-confronting inner surface of one winding end portion and the other tubular insulator abutting an axis-confronting inner surface of the other winding end portion; and
a cooling jacket arranged in circumferential direction of the stator housing,
wherein a cavity is bounded only by one tubular insulator in concert with an end face of the housing and the cooling jacket for receiving one winding end portion, and wherein another cavity is bounded only by the other tubular insulator in concert with another end face of the housing and the cooling jacket for receiving the other winding end portion, with each of the cavities being filled out with insulating casting material.

7. The electric drive of claim 6, wherein each tubular insulator has a housing-confronting end face which includes a centering ring for radially centering the tubular insulator in relation to the stator bore of the housing.

8. The electric drive of claim 7, wherein the centering ring is formed integrally with the tubular insulator.

9. The electric drive of claim 7, and further comprising a pair of circular cover slides, one cover slide engaging slots of the housing at one end face thereof to cover a slot structure, and the other cover slide engaging slots of the housing at another end face thereof to cover a slot structure, wherein the cover slides are arranged in surrounding relationship to the stator bore and project beyond the end faces of the housing, wherein the centering rings support the tubular insulators against the cover slides and seal a junction between the tubular insulators and the end faces of the housing in radial direction by abutting against a backside of the cover slides and in axial direction by bearing against slot flanks.

10. The stator of claim 6, wherein each tubular insulator has a housing-distal end provided, with a reinforcement for providing a measure for a required filling height of the casting material during potting of the winding end portions.

* * * * *